US005591339A

United States Patent [19]
Robinson

[11] Patent Number: 5,591,339
[45] Date of Patent: Jan. 7, 1997

[54] SELF-CLEANING FILTER SCREEN FOR VENTURI SUCK BACK PASSAGE

[76] Inventor: Webster Robinson, Rte. 1 Box 103 A4, Clayton, La. 71376

[21] Appl. No.: 515,902

[22] Filed: Aug. 16, 1995

[51] Int. Cl.[6] ..... B01D 35/02
[52] U.S. Cl. ..... 210/499; 244/136
[58] Field of Search ..... 210/498, 499; 55/306, 312, 498; 244/136

[56] References Cited

U.S. PATENT DOCUMENTS

| | | | |
|---|---|---|---|
| 3,475,883 | 11/1969 | Sullivan . | |
| 3,674,154 | 7/1972 | Sicard | 210/499 |
| 3,701,433 | 10/1972 | Krakauer et al. | 210/499 |
| 3,938,586 | 2/1976 | Barlow et al. | 55/277 |
| 4,190,217 | 2/1980 | O'Connor | 55/306 |
| 4,263,140 | 4/1981 | Wujnovich | 210/499 |
| 4,514,201 | 4/1985 | Brown | 55/433 |
| 5,113,643 | 5/1992 | Peterson et al. . | |
| 5,234,592 | 8/1993 | Schneider | 210/499 |
| 5,482,622 | 1/1996 | Stark et al. | 210/499 |

*Primary Examiner*—W. L. Walker

[57] ABSTRACT

The invention is a filtering device for the drilled passage in on-off control valves used in aircraft liquid crop spraying systems. The device is mounted within the on-off control valve in the spray boom supply line at the opening of the drilled passage which connects the low pressure area of the suck back venturi to the spray boom supply line. In the "two-part" and "four-part" configuration of the device, it is composed of a small gauge wire mesh sleeve inside a perforated cylinder with raised collars on both ends. The collars secure and align the device in the on-off control valve assembly. The collars may be machined in one piece with the perforated cylinder (the "two-part" configuration) or machined separately and fitted onto the ends of the perforated cylinder (the "four-part" configuration). In the "one-part" configuration, the device consists of a cylindrical, open-ended, small gauge wire mesh sleeve mounted over the machined portion of the on-off control valve where the drilled passage meets the spray boom supply line.

4 Claims, 5 Drawing Sheets

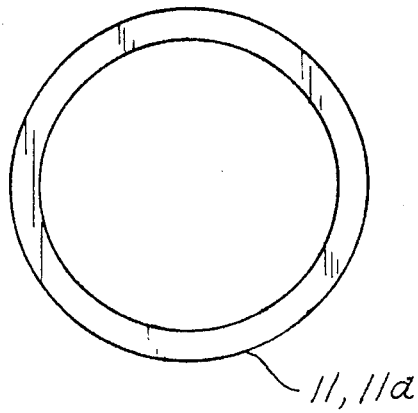
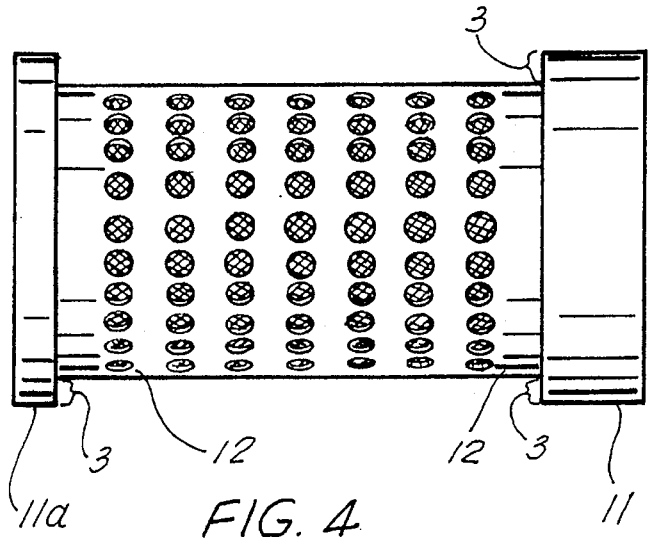
FIG. 5        FIG. 4
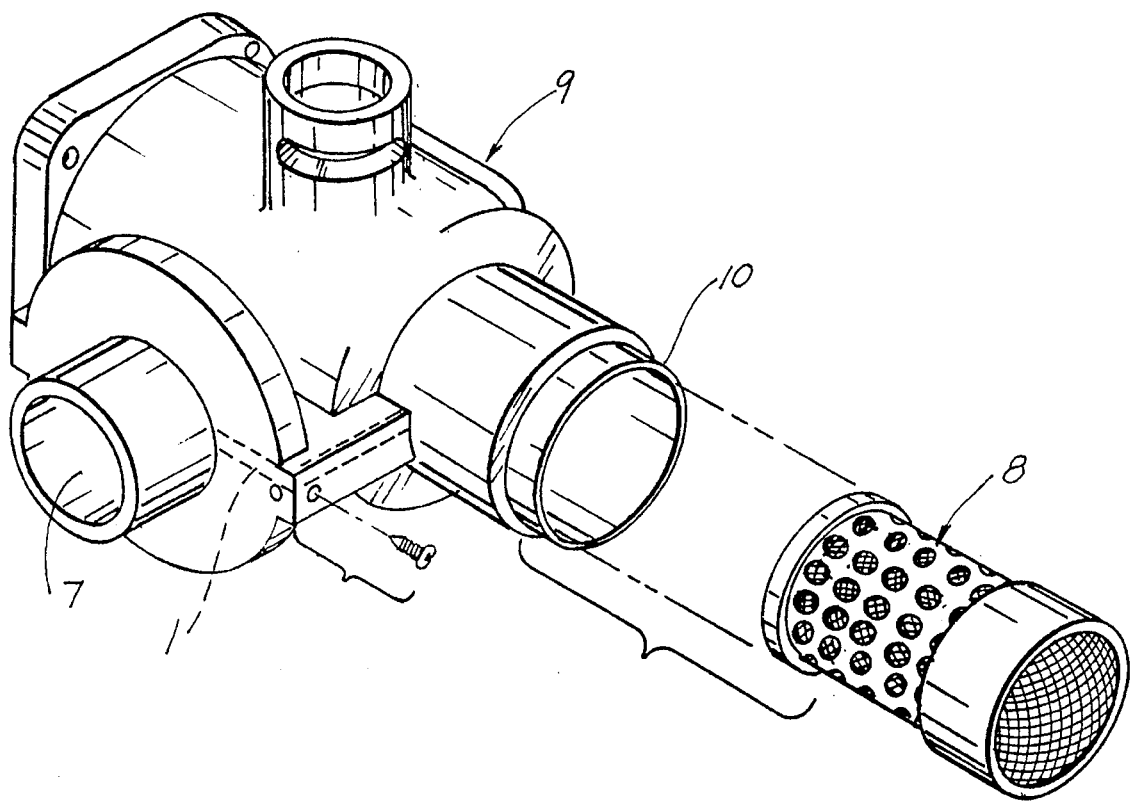
FIG. 3

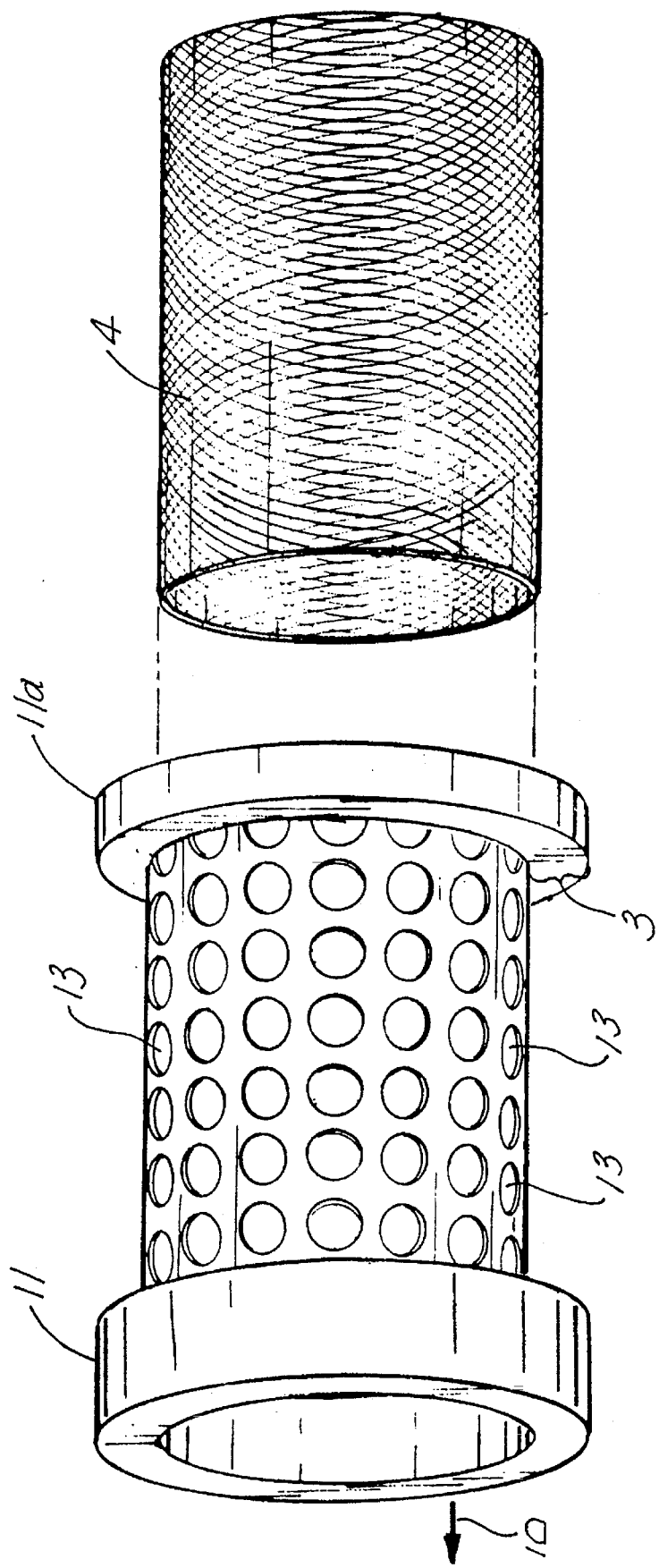

SELF-CLEANING FILTER SCREEN FOR VENTURI SUCK BACK PASSAGE

CROSS-REFERENCE

There are no co-pending applications which relate to or involve this device.

GOVERNMENTAL RIGHTS

The conception and development of this device did not result from federally sponsored research or activities.

BACKGROUND

A. Technical Field

The present invention relates to an open-ended filter screen mounted in the spray boom supply line of the on-off control valve assembly of aircraft crop dusting spraying systems at the opening of the drilled passage which connects the low pressure area of the suck back Venturi to the spray boom supply line.

B. Description of Prior Art

The unwanted discharge of pesticides and other chemicals used during crop dusting is a serious concern. Aircraft operators and landowners who spill crop dusting materials onto the property of others or into surface waters face substantial liability under state tort law as well as federal environmental law. For example, some state and federal environmental laws impose liability for pollution and personal injury even if an operator or land owner is completely free of fault. Thus, there is a great need for crop dusting systems which minimize such unwanted discharges.

An aircraft liquid crop spraying system is composed of several different parts. The liquid which will be sprayed is stored in an internal hopper or tank. The spraying equipment often consists of an assembly bolted to the bottom of the hopper tank that supports a pump 2 and an on-off control valve 9.

The liquid to be sprayed is forced from the hopper into the on-off control valve 9 via a pump 2. When the on-off control valve 9 is open (FIG. 1), the liquid passes through the valve 9 into a large strainer prior to entering the spray boom. The spray boom is customarily attached to the trailing edge of the wing by hangers fastened to the wing's frame. Nozzles for atomizing the spray are placed along the boom on each wing. Each nozzle has a spring loaded, diaphragm cutoff valve. The pump pressure forces the diaphragm valves open, and the liquid is sprayed through the nozzles.

When the on-off control valve 9 is in the closed position (FIGS. 2 & 8), crop dusting fluids are recirculated 14 back to the hopper for agitation. The recirculating fluid passes through a suck back Venturi 7 located in the on-off control valve 9. The low pressure area of the Venturi 6 is connected to the spray boom supply line 10 via a small drilled passage 1. The drilled passage 1 allows fluid to be drawn from the boom into the low pressure area 6 of the Venturi 7 during recirculation (FIG. 2).

Drawing fluid from the boom through the drilled passage 1 effectively lowers the boom pressure and enables the diaphragm valves on the spray nozzles to close quickly. In other words, the quicker the boom fluid pressure drops, the quicker the spray nozzles close, thereby preventing waste and environmental contamination caused by unwanted fluid discharges during turns and ferrying.

Keeping the drilled passage 1 free of obstructions is critical to preventing unwanted liquid loss. However, pesticides and other spraying fluids often contain foreign particles such as rubber, glass, gravel or dirt. As the fluid is being drawn from the spray boom through the drilled passage 1 in the recirculating mode (FIG. 2), the foreign particles present in the fluid often obstruct or block the drilled passage 1. This blockage in the drilled passage 1 impedes the drop in boom pressure, causing the nozzles to drip during turns or while ferrying.

Blockage in the drilled passage 1 can also combine with other problems to cause unwanted fluid discharges. For instance, the on-off control valves 9 used in the industry typically employ a ball type valve 15. The placement of the ball in the valve determines whether the fluid used enters the spray boom or recirculates to the hopper for agitation after passing through the suck back Venturi 7. Through extended use, however, the ball and its corresponding seal often deteriorate and fail to provide a leak proof seal. Thus, fluid enters the spray boom while the system is in recirculating mode.

When the drilled passage 1 is clear, this fluid returns to the hopper via the drilled passage 1 due to the low pressure area 6 created by the suck back Venturi 7. When the drilled passage 1 is blocked, however, this fluid accumulates in the spray boom. Eventually, the boom pressure reaches a level sufficient to open the diaphragm valves causing unwanted discharge.

For the foregoing reasons, there is a need for an inexpensive device which prevents particles in crop dusting fluids from blocking the drilled passage 1 and causing unwanted and possibly unlawful discharges into the environment. The invention resolves the above problems by ensuring that the drilled passage 1 remains clear of debris. As will be shown below, its chief features, which can be embodied in a number of forms, allow filtered fluids 360 degree access to the drilled passage. Moreover, the inventions' self-cleaning feature, which occurs during the spray mode, ensures continuous access to both the drilled passage 1 and the spray boom.

SUMMARY

The present invention is a device which prevents the clogging of the drilled passage 1, thereby avoiding the unwanted discharge of crop dusting materials into the environment. The Self-Cleaning Filter Screen for the Venturi Suck Back Passage 8 is an open-ended, filter screen that is placed in the on-off control valve 9 assembly of existing aircraft liquid crop dusting systems.

In the "two-part" and "four-part" configurations of the device (FIGS. 6 & 7), the perforated, filtering portion of the invention 12 has a narrower diameter 3 than the spray boom supply line portion of the on-off control valve 9, which allows free fluid flow to the drilled passage 9.

In the "one-part" configuration of the device (FIG. 8), a portion of the on-off control valve 9 is machined ("the machined portion") 16 in the spray boom supply line 10 around the opening of the drilled passage 1, which provides the space 3 between the filtering portion of the invention and the on-off control valve 9. In the "one-part" configuration of the device, the device consists of an open-ended wire mesh sleeve 4 mounted over the machined portion 16 of the on-off control valve 9.

The length and diameter of the invention vary with the type of on-off control valve 9 used. Generally, all configu-

3 rations of the device should be constructed from a corrosion resistant, metallic substance such as stainless steel.

In the "two-part" and "four-part" configurations of the device, the non-perforated ends of the device are collared with a wider outside diameter (FIGS. 6 & 7). This difference in diameter 3 seals and aligns the filter 8 by fitting it snugly within the on-off control valve 9. FIG. 4 shows that the collar 11 closest to the spray boom assembly is wider than the collar 11(a) closest to the hopper.

The perforations along the narrow, filtering portion of the device 12 are lined with a 50 to 100 gauge wire mesh sleeve 4. The perforations 12 allow for 360 degree fluid access to the drilled passage 1 and the wire mesh sleeve 4 filters any foreign objects that might obstruct the drilled passage 1. The device 8 is self-cleaning. Any trapped foreign objects are purged through the system when the on-off control valve is open (FIG. 1).

This device can be applied to any system which employs a passage accessing the low pressure area 6 of a Venturi 7. In summary, when properly installed, the device eliminates nozzle dripping when the on-off control valve is in the closed position (FIG. 2). The device conserves material and prevents unwanted and possibly unlawful fluid discharges.

BRIEF DESCRIPTION OF THE DRAWINGS

These and other features, aspects, and advantages of the present invention will become better understood upon reading the following detailed description in conjunction with the accompanying drawings:

FIG. 3 shows an ordinary view of the invention 8 and a typical on-off control valve 9 in which the Self-Cleaning Filter Screen 8 is placed. This diagram also shows the location of the drilled passage 1 within the on-off control valve 9;

FIG. 4 shows a side view of the "two-part" and "four-part" configurations of the Self Cleaning Filter Screen;

FIG. 5 shows the top and bottom view of the "two-part" and "four-part" configurations of the device. This diagram also shows that the Self Cleaning Filter Screen 8 is open-ended;

FIG. 6 shows an exploded view of the Self-Cleaning Filter Screen 8 in the "two-part" configuration;

DESCRIPTION OF THE INVENTION

A. Definitions

Figure 2:
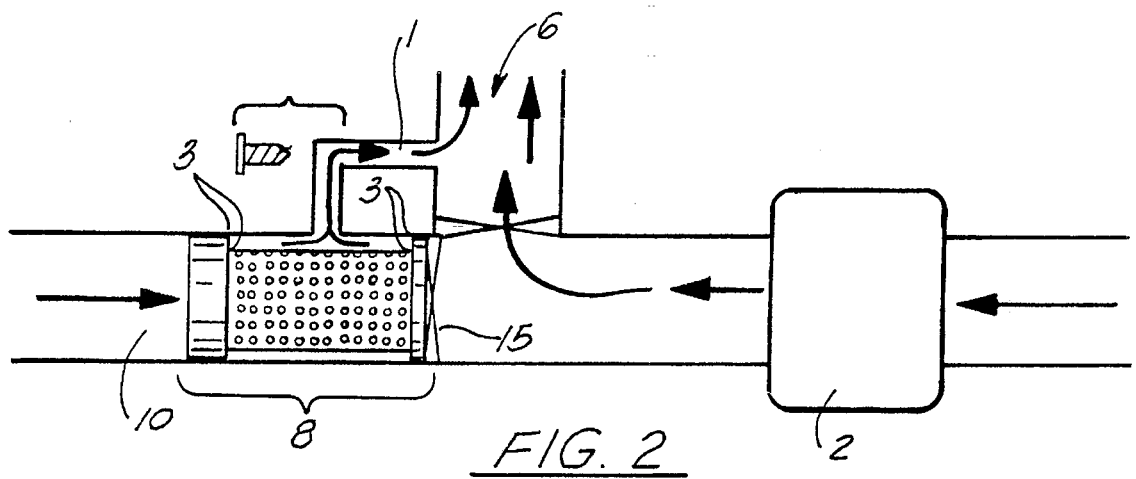
FIG. 2 shows an exposed view of the on-off control valve 9 in which the Self-Cleaning Filter Screen 8 is placed. This diagram also displays the fluid path of the crop spraying substance while the on-off control valve is in recirculating mode.

Drilled Passage 1—That portion of a typical crop spraying on-off control valve 9 which connects the low pressure portion 6 of the suck back Venturi 7 with the spray boom supply line 10 for the purpose of rapidly lowering of boom pressure causing the spray nozzles to close quickly when the on-off control valve 9 is in the closed position (FIG. 2).

Figure 1A:
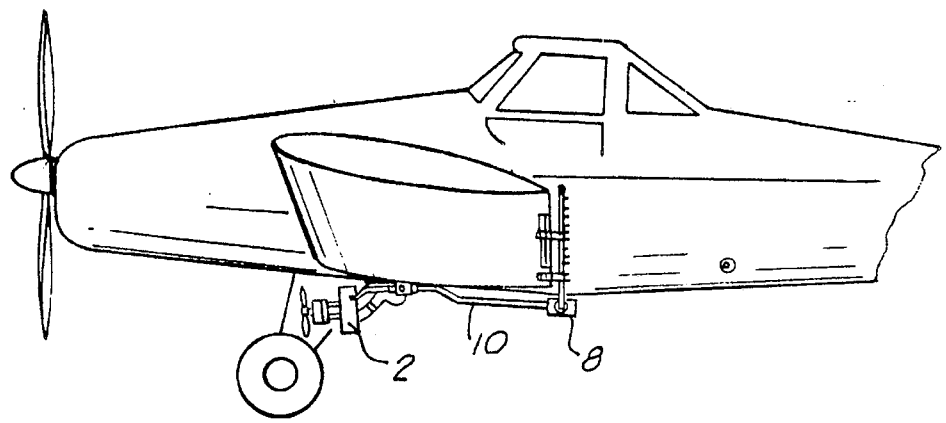
FIG. 1A shows the combination of the screen and crop dusting system mounted on an aircraft.
Figure 1:
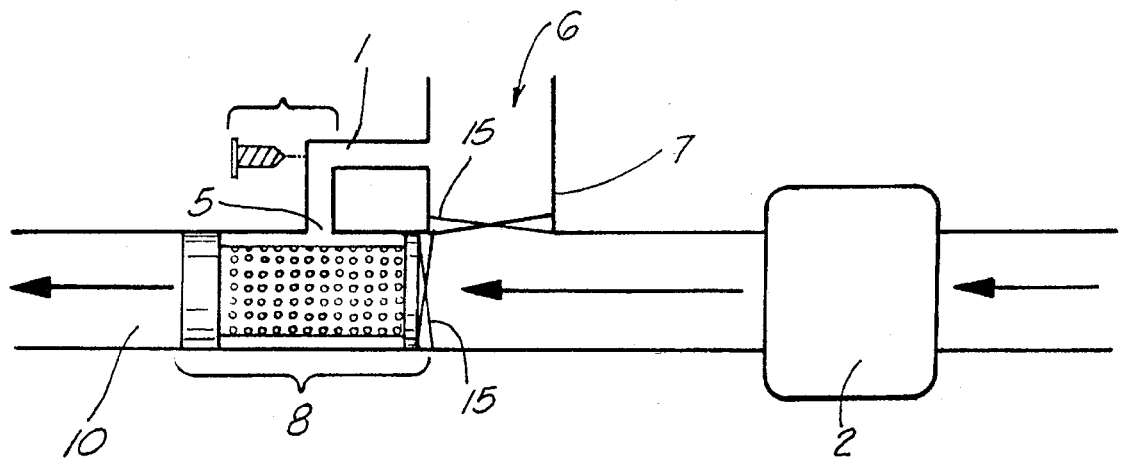
FIG. 1 shows an exposed view of the on-off control valve 9 in which the Self-Cleaning Filter Screen 8 is placed. This diagram also displays the fluid path of the crop spraying substance while the on-off control valve is in open (spray) mode.

On-Off Control Valve 9—A valve that either allows crop dusting fluids to flow from the hopper to the spray boom or closes off the spray boom and recirculates the fluids back to the hopper (FIGS. 1 & 2).

Suck Back Venturi 7—A typical Suck Back Venturi is comprised of two truncated cones connected by a short throat, and it is located in the recirculating line 14 of the on-off control valve 9.

B. Detailed Description of the Elements

Figure 7:
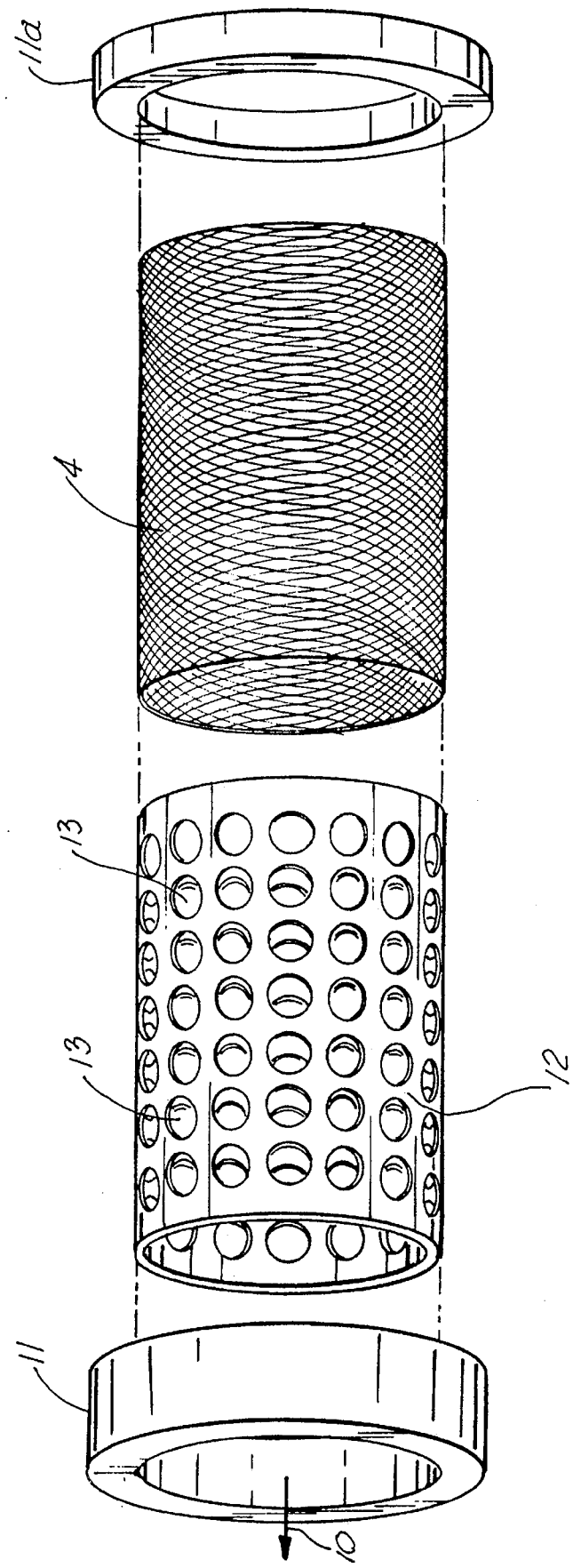
FIG. 7 shows an exploded view of the Self Cleaning Filter Screen 8 in the "four-part" configuration.
Figure 8:
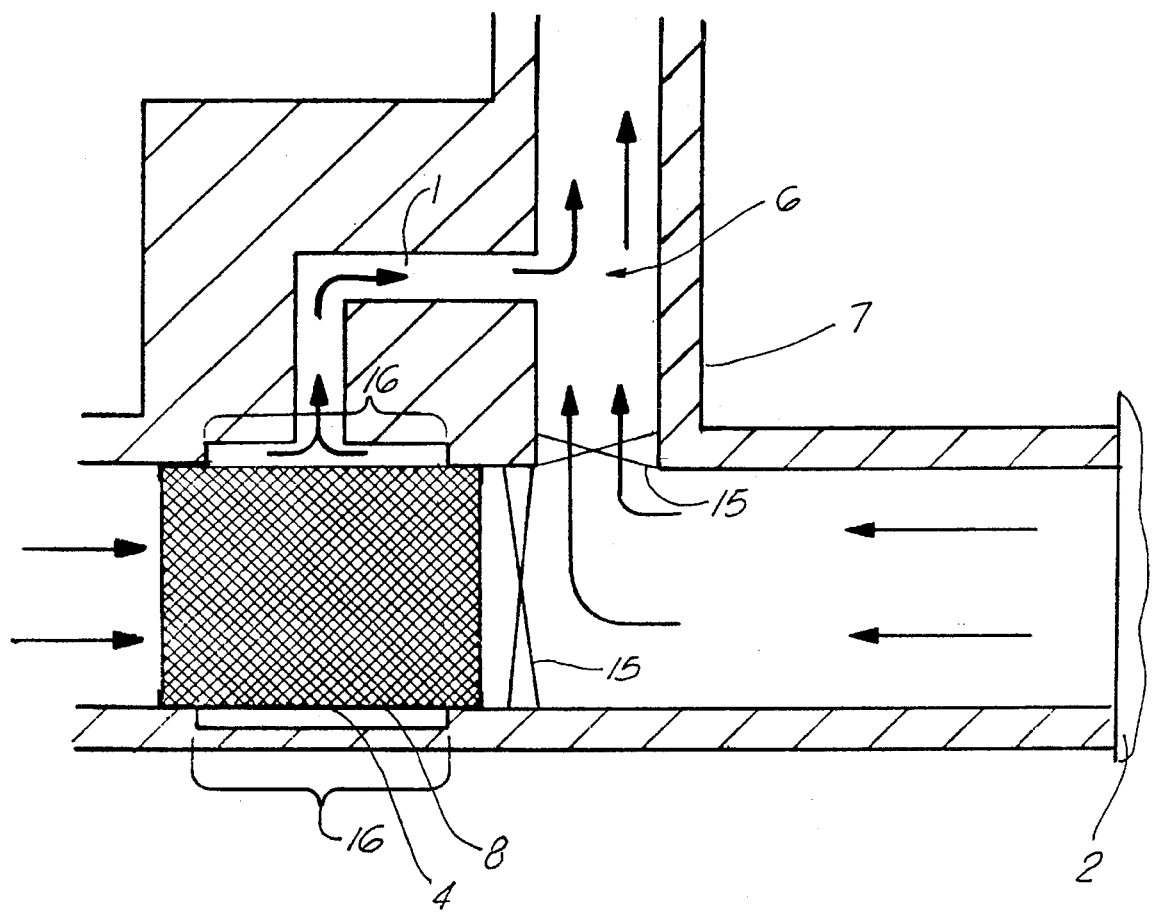
FIG. 8 shows an exposed view of the on-off control valve 9 in the "one-part" configuration of the device in which the Self-Cleaning Filter Screen 8 consists of a fine wire mesh screen 4 mounted over the machined portion 16 of the on-off control valve 9. This diagram also displays the fluid path of the crop spraying substance while the on-off control valve is in the closed (recirculating) mode.

The device 8 is composed of either one (FIG. 8), two (FIG. 6) or four (FIG. 7) component parts, and it is easily constructed. In either configuration, the Self-Cleaning Filter Screen 8 has generally the same shape and functions exactly in the same manner. In the "two-part" and "four-part" configurations, the central portion of the cylinder 12 is narrower or smaller in diameter than the two ends forming collars 11 & 11(a), which create a space 3 between the outer diameter of the perforated cylinder 12 and the interior diameter of the spray boom supply line 10 portion of the on-off control valve assembly 9. The collars 11 & 11(a) at the ends of the perforated cylinder 12 properly secure and align the device in the on-off control valve 9 and maintain a uniform distance 3 between the opening to the drilled passage 5 and the perforated cylinder 12.

In the "two-part" and "four-part" configurations of the device, the perforated cylinder 12 which covers the wire mesh sleeve 4 is perforated uniformly around the entire circumference of the cylinder. These holes 13 allow fluid to return to the hopper from the spray boom via the drilled passage 1.

The interior circumference of the perforated cylinder 12 is lined with a small gauge wire mesh sleeve 4. This wire mesh filters the fluid which passes through the perforations before it enters the drilled passage 1. Since the ends of the device 8 are not covered by the wire mesh 4, filtered foreign particles are purged through the system during the spray mode (FIG. 1), which makes the device self-cleaning.

In the "two-part" configuration (FIG. 6), the device 8 is principally comprised of a perforated cylinder 12 and a small gauge wire mesh sleeve 4. This configuration can be constructed by machining the collars 11 & 11(*a*) and the perforated cylinder 12 in one piece with a narrower outside diameter for the perforated cylinder 12.

In the "four-part" configuration (FIG. 7), the collars 11 & 11(*a*) are separately machined sleeves, which fit over each end of the perforated cylinder 12. These collars 11 & 11(*a*) have an interior diameter slightly larger than the exterior diameter of the perforated cylinder 12. In this manner, the collars 11 & 11(*a*) fit snugly on the ends of the perforated cylinder 12. In this version of the device 8, the perforated cylinder 12 need not be machined as it is sealed off by the collars 11 & 11(*a*).

In the "one-part" configuration of the device (FIG. 8), the on-off control valve is machined 16 around the opening of the drilled passage 1 where it meets the spray boom supply line 10, creating a space between the device and the on-off control valve. In this configuration, the device only consists of a cylindrical, open-ended, small gauge wire mesh sleeve 4. The device need not be collared or have a perforated cylinder 12 covering the filter screen 4, because the space needed for filtering 3 is provided by the machined portion 16 of the on-off control valve 9.

D. Advantages of the Invention

The previously described versions of the invention have many advantages including its inexpensive and simple construction as well as its easy incorporation into existing aircraft crop spraying systems. Additionally, the present invention provides a cost effective resolution to serious economic and environmental concerns. As a practical matter, the device is easily constructed from readily available materials. These materials include corrosion resistant wire mesh and tubing. The manufacturing process is also straight forward and simple.

The length and diameter of the invention may vary with the specifications of the on-off control valve used. The device need not be removed once installed as the invention is self-cleaning and not susceptible of wear and tear. Installation is simple as the device need only be placed in the portion of the on-off control valve leading the spray boom. The invention may be held in place by friction, a rivet, a tack weld or other similar means.

Although the present invention has been described in considerable detail with reference to certain preferred versions, many other versions are possible. For example, a variety of materials including non-ferrous metals such as aluminum and man-made substances such as plastic or composites can be used to construct the device. Additionally the device can be easily adapted to almost all on-off control valve types which employ a suck back Venturi and drilled passage accessing the low pressure area. The device offers immediate and permanent relief from the previously described difficulties.

I claim:

1. In combination, a self-cleaning, open-ended filter screen and an aircraft crop dusting system of a type having a fluid reservoir, a spray boom connected to the wing of the aircraft, a supply line communicating said fluid reservoir with said spray boom, a pump communicating with said supply line for supplying fluid to said spray boom under pressure, a valve assembly mounted in said fluid supply line between said pump and said spray boom for controlling the flow of said fluid to the spray boom, a recirculating line communicating with the fluid supply line between said pump and said valve assembly for recirculating the fluid back into the reservoir when the valve is in a closed position, an aspiration passage communicating with said recirculating line and said fluid supply line, said aspiration passage having an inlet between said spray boom and valve assembly, whereby when the valve assembly is closed, fluid is drawn from the spray boom through the aspiration passage back into said recirculating line to the reservoir; said self-cleaning open-ended filter screen comprising a wire mesh sleeve mounted in the fluid supply line between the spray boom and valve assembly and communicating with said aspiration passage, whereby foreign particles are filtered out of the fluid being drawn from the spray boom, to thereby prevent blockage of said aspiration passage, the filtered foreign particles being purged from the filter and fluid supply line when the valve assembly is in an open position allowing the fluid to flow to the spray boom.

2. The combination according to claim 1, wherein an annular space is provided between said wire mesh sleeve and the inlet of said aspiration passage.

3. The combination according to claim 2, wherein an open-ended perforated cylinder surrounds said wire mesh sleeve, a collar connected to each end of said perforated cylinder, each of said collars having a larger diameter than said perforated sleeve, said collars engaging the interior wall surface of said fluid supply line to provide a seal to ensure fluid flow through the filter screen, the annular space and into the aspiration passage when the valve assembly is closed.

4. The combination according to claim 3, wherein the collars are integral with the perforated cylinder.

* * * * *